US012640045B2

(12) United States Patent
Matsuyama

(10) Patent No.: US 12,640,045 B2
(45) Date of Patent: May 26, 2026

(54) ELECTRONIC APPARATUS, METHOD FOR CONTROLLING ELECTRONIC APPARATUS, AND STORAGE MEDIUM

(71) Applicant: CANON KABUSHIKI KAISHA, Tokyo (JP)

(72) Inventor: Yuki Matsuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/487,940

(22) Filed: Oct. 16, 2023

(65) Prior Publication Data

US 2024/0161642 A1 May 16, 2024

(30) Foreign Application Priority Data

Nov. 11, 2022 (JP) ................................. 2022-181235

(51) Int. Cl.
*G09B 5/02* (2006.01)
*G06F 3/0483* (2013.01)
*G06F 3/04842* (2022.01)

(52) U.S. Cl.
CPC ............. *G09B 5/02* (2013.01); *G06F 3/0483* (2013.01); *G06F 3/04842* (2013.01)

(58) Field of Classification Search
CPC .......... G09B 5/02; G06F 3/0483; G06Q 10/20
See application file for complete search history.

(56) References Cited

U.S. PATENT DOCUMENTS 11,256,771 B2 * 2/2022 Suzuki ................ G06F 16/9554
2002/0169584 A1 * 11/2002 Fu .......................... G16H 70/20
702/188

2003/0220809 A1 * 11/2003 Komine ................ G06Q 10/20
705/305
2012/0317480 A1 * 12/2012 Onishi ............... H04N 1/00344
715/273
2013/0077117 A1 * 3/2013 Kobayashi ......... H04N 1/00496
358/1.13
2013/0173288 A1 * 7/2013 Masuda ................ G06Q 10/20
705/2
2013/0329111 A1 * 12/2013 Desai ..................... H04N 23/64
348/333.02
2014/0362401 A1 * 12/2014 Yamashita ......... H04N 1/00503
358/1.15
2015/0120606 A1 * 4/2015 Hashimoto ........... G06F 16/381
705/343
2015/0355871 A1 * 12/2015 Nakata .................. G06F 9/4411
358/1.15
2015/0378749 A1 * 12/2015 Yamashita ......... H04N 1/00411
715/708

FOREIGN PATENT DOCUMENTS

JP            2018-152128          9/2018

* cited by examiner

*Primary Examiner* — Peter R Egloff

(74) *Attorney, Agent, or Firm* — Venable LLP

(57) ABSTRACT

An electronic apparatus includes: a reception unit that receives an instruction to open a manual related to a predetermined apparatus status of the electronic apparatus; and a display control unit that, in a case where a set value set for the electronic apparatus satisfies a predetermined display condition, from the manual including a plurality of description items corresponding to the predetermined apparatus status, displays part of the description items based on the set value.

9 Claims, 11 Drawing Sheets

| WORDING 1 | DISPLAY CONDITION 1 |
|---|---|
| FOR PAPER-BASED SHEETS SUCH AS THICK COATED PAPER, GO TO TOUCH SCREEN MENU AND SET [ABSORPTION POWER OF CONVEYANCE UNIT] TO [MILDLY STRONG] OR [STRONG]. | SHEETS BEING SET = PAPER-BASED SHEETS |
| WORDING 2 | DISPLAY CONDITION 2 |
| FOR FILM-BASED SHEETS SUCH AS TRACING PAPER (CAD), GO TO TOUCH SCREEN MENU AND SET [ABSORPTION POWER OF CONVEYANCE UNIT] TO [STANDARD], [MILDLY STRONG], OR [STRONG]. | SHEETS BEING SET = FILM-BASED SHEETS |
| WORDING 3 | DISPLAY CONDITION 3 |
| FOR THIN SHEETS WITH 0.1 mm OR LESS THICKNESS, GO TO TOUCH SCREEN MENU AND SET [ABSORPTION POWER OF CONVEYANCE UNIT] TO [WEAK]. | SHEETS BEING SET = THIN SHEETS |
| WORDING 4 | DISPLAY CONDITION 4 |
| GO TO TOUCH SCREEN MENU AND SET [CUTTING MODE] TO [USER CUTTING] AND SET [SHEET EDGE DETECTION] TO [OFF]. | (CUTTING MODE ≠ USER CUTTING) OR (SHEET EDGE DETECTION = OFF) |
| WORDING 5 | DISPLAY CONDITION 5 |
| IS [PRIORY SETTING] SET TO [LENGTH PRIORITIZED] ON TOUCH SCREEN MENU? PROBLEM MAY BE REMEDIED BY SETTING [PRIORITY SETTING] TO [QUALITY PRIORITIZED] AND ADJUSTING SHEET FEED AMOUNT. | PRIORITY SETTING = LENGTH PRIORITIZED |

Figure 6:
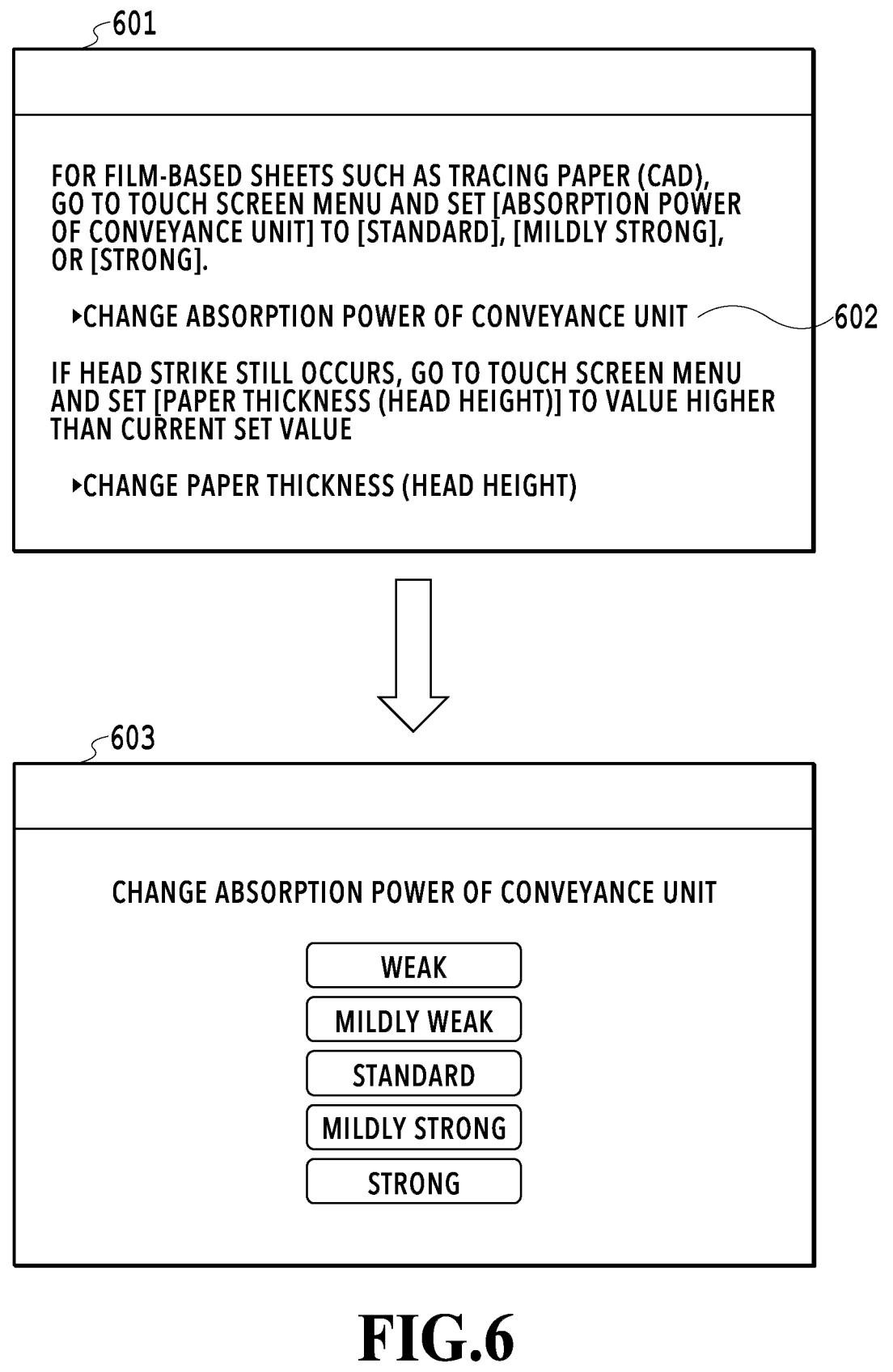

FOR FILM-BASED SHEETS SUCH AS TRACING PAPER (CAD), GO TO TOUCH SCREEN MENU AND SET [ABSORPTION POWER OF CONVEYANCE UNIT] TO [STANDARD], [MILDLY STRONG], OR [STRONG].

▸CHANGE ABSORPTION POWER OF CONVEYANCE UNIT ⌐602

IF HEAD STRIKE STILL OCCURS, GO TO TOUCH SCREEN MENU AND SET [PAPER THICKNESS (HEAD HEIGHT)] TO VALUE HIGHER THAN CURRENT SET VALUE

▸CHANGE PAPER THICKNESS (HEAD HEIGHT)

603

CHANGE ABSORPTION POWER OF CONVEYANCE UNIT

WEAK

MILDLY WEAK

STANDARD

MILDLY STRONG

STRONG

CHANGE DISPLAY RANGE

FOR PAPER-BASED SHEET SUCH AS THICK COATED PAPER,
GO TO TOUCH SCREEN MENU AND SET [ABSORPTION POWER
OF CONVEYANCE UNIT] TO [MILDLY STRONG] OR [STRONG].

IF HEAD STRIKE STILL OCCURS, GO TO TOUCH SCREEN MENU AND
SET [PAPER THICKNESS (HEAD HEIGHT)] TO VALUE HIGHER THAN
CURRENT SET VALUE

▸CHANGE ABSORPTION POWER FOR SHEETS
    ▸IMPROVE HEAD STRIKE ON SHEETS OR IMAGE SMUDGINESS

FOR FILM-BASED SHEETS SUCH AS TRACING PAPER (CAD),
GO TO TOUCH SCREEN MENU AND SET [ABSORPTION POWER OF
CONVEYANCE UNIT] TO [STANDARD], [MILDLY STRONG],
OR [STRONG].

IF HEAD STRIKE STILL OCCURS, GO TO TOUCH SCREEN MENU AND
SET [PAPER THICKNESS

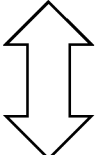

803

CHANGE DISPLAY RANGE

FOR PAPER-BASED SHEET SUCH AS THICK COATED PAPER,
GO TO TOUCH SCREEN MENU AND SET [ABSORPTION POWER
OF CONVEYANCE UNIT] TO [MILDLY STRONG] OR [STRONG].

IF HEAD STRIKE STILL OCCURS, GO TO TOUCH SCREEN MENU AND
SET [PAPER THICKNESS (HEAD HEIGHT)] TO VALUE HIGHER THAN
CURRENT SET VALUE

▸CHANGE ABSORPTION POWER FOR SHEETS
    ▸IMPROVE HEAD STRIKE ON SHEETS OR IMAGE SMUDGINESS

FIG.8

ELECTRONIC APPARATUS, METHOD FOR CONTROLLING ELECTRONIC APPARATUS, AND STORAGE MEDIUM

BACKGROUND

Field

The present disclosure relates to a technique of displaying a manual.

Description of the Related Art

An electronic manual is often used as a document explaining how to operate an electronic apparatus. An electronic manual describes how to operate an electronic apparatus, how to troubleshoot problems, or the like. Japanese Patent Laid-Open No. 2018-152128 discloses a system for promptly displaying information needed by a user from an electronic manual by identifying and displaying a page related to the problem that the apparatus is experiencing currently.

SUMMARY

A typical manual exhaustively describes solutions for possible problems in all situations. Thus, solutions for conditions that do not match the current status of the apparatus are also displayed, making it difficult to find target information.

An electronic apparatus according to an aspect of the present disclosure includes: a reception unit that receives an instruction to open a manual related to a predetermined apparatus status of the electronic apparatus; and a display control unit that, in a case where a set value set for the electronic apparatus satisfies a predetermined display condition, from the manual including a plurality of description items corresponding to the predetermined apparatus status, displays part of the description items based on the set value.

Further features of the present invention will become apparent from the following description of exemplary embodiments with reference to the attached drawings.

BRIEF DESCRIPTION OF THE DRAWINGS

FIG. 3 is an example of a display conditions table;
FIG. 6 is an example of how a manual is displayed;
FIG. 8 is an example of how a manual is displayed.

DESCRIPTION OF THE EMBODIMENTS

The following describes embodiments of the present disclosure in detail. Note that constituents described in these embodiments show example modes of the present disclosure and are not intended to limit the scope of the disclosure only to them.

Embodiment 1

Figure 1:
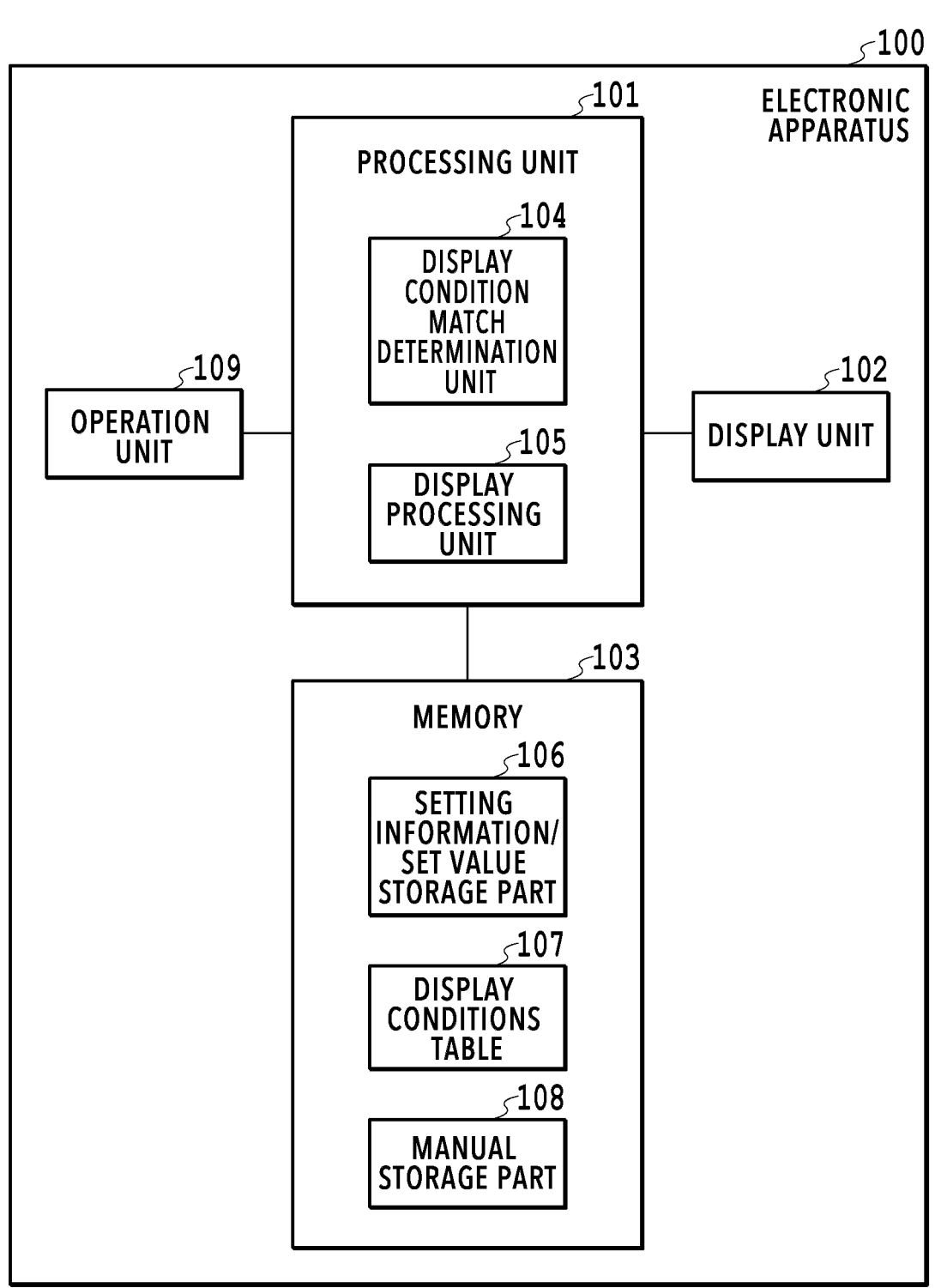
FIG. 1 is a block diagram of an electronic apparatus.

FIG. 1 is a block diagram of an electronic apparatus 100 of the present embodiment. An electronic apparatus refers to a printer, a personal computer (PC) (an information processing apparatus), a mobile terminal, or the like. The electronic apparatus 100 shown in FIG. 1 has a processing unit 101, a display unit 102, a memory 103, and an operation unit 109. The processing unit 101 has a display condition match determination unit 104 and a display processing unit 105, and is a CPU that controls the electronic apparatus 100. The memory 103 has a setting information/set value storage part 106, a display conditions table 107, and a manual storage part 108. The display condition match determination unit 104 determines whether to display a particular manual. Details of the determination processing will be described later using FIG. 3.

The display processing unit 105 displays, on the display unit 102, a passage from the manual determined to be displayed by the display condition match determination unit 104. The setting information/set value storage part 106 is a storage region for storing setting information or set values currently set for the electronic apparatus. The display conditions table 107 is a table storing display conditions set for respective passages from the manual. The manual storage part 108 is a memory storing contents of the manual. The following description assumes that the electronic apparatus 100 is a printer with a print function and that the manual describes how to operate the printer, solutions for problems that the printer may be having, or both. The manual of the present embodiment exhaustively provides descriptions of an electronic device and solutions for problems regarding the electronic device. In other words, the manual of the present embodiment exhaustively provides descriptions of events that can happen for the electronic device. As an example, a case is considered where a problem related to print sheets has occurred in a printer. In this regard, the manual provides solutions for cases with all the types of print sheets (for example, the total of five sheet types: a sheet type A, a sheet type B, a sheet type C, a sheet type D, and a sheet type E) even in a case where the type of the print sheets actually set in the printer is, for example, the sheet type A.

Figure 2:
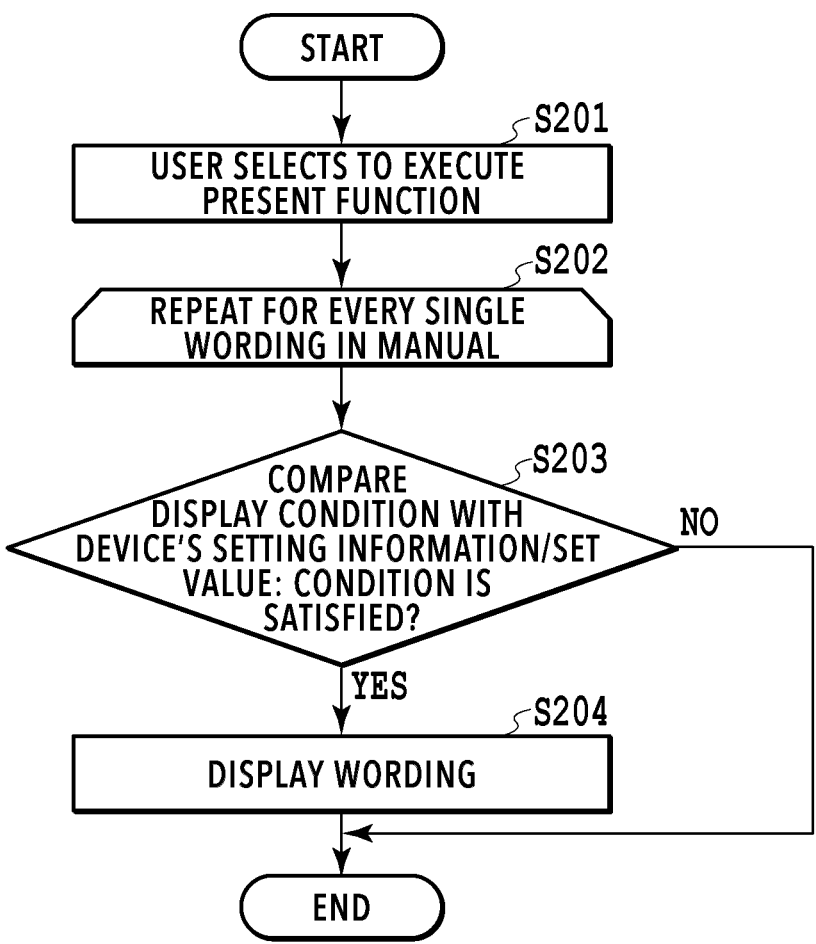
FIG. 2 is a flowchart of manual display.

FIG. 2 is a flowchart of manual display in the present embodiment. Described is how manual display range change processing is executed once a user selects execution of the present flowchart after opening the manual. In the manual display range change processing, a limited range from a manual display screen providing exhaustive descriptions for a certain setting item is displayed based on a set value currently set for the electronic apparatus 100. As a result, parts of the manual less irrelevant to the current settings of the electronic apparatus 100 are no longer displayed, making the manual display screen more easy-to-see. A series of processes shown in the present flowchart are performed by the processing unit 101 of the electronic apparatus 100 by loading and executing program code stored in the memory 103. Note that "S" used in the following description of each process means that it is a step in the flowchart, and this applies to the rest of the embodiments as well. The processing of the present flowchart is started once the electronic apparatus 100 displays a manual on the display unit 102 in response to a user instruction to display the manual.

In S201, using the operation unit 109, the user selects to execute the present function (the manual display range change processing). Also, for example, a display range change button may be disposed on the manual display screen, and the processing of this step may be executed once the user presses the display range change button. Also, a setting to execute the present function may be configured in advance, and the display range change may be performed once the manual is opened, without receiving the user operation.

S202 to S204 are loop processing that the display condition match determination unit 104 of the electronic apparatus 100 repeats for every wording in the manual.

In S203, the display condition match determination unit 104 of the electronic apparatus 100 compares the setting information/set value storage part 106 with the display conditions table 107. The display conditions table 107 stores therein a display condition set for every passage from the manual. A display condition includes a condition associating a setting item for the electronic apparatus 100 with setting information (or a set value). For example, a condition for determining what to display is defined like "if a particular value is set for a particular setting item for the electronic apparatus 100." The display condition match determination unit 104 inquires of the setting information/set value storage part 106 based on a display condition, and determines, based on setting information (or a set value), whether the display condition is satisfied. If it is determined in S203 that the display condition is satisfied, the electronic apparatus 100 proceeds to S204. Meanwhile, if it is determined that the display condition is not satisfied, the electronic apparatus 100 repeats S203 for the next wording in the manual.

In S204, the display processing unit 105 of the electronic apparatus 100 displays, on the display unit 102, the wording in the manual determined as satisfying the display condition in S203. Then, S203 is repeated for the next wording of the manual. After S203 is executed for all the wordings in the manual, execution of the present processing ends.

FIG. 3 is an example of the display conditions table 107 of the present embodiment. A wording 1, a wording 2, and a wording 3 are description items in the manual related to sheets that may be set in the electronic apparatus 100. In regular manual display, all these wordings are displayed on the display screen.

Once the manual display range change processing is applied, for example, in a case where the display condition 1 matches the set value for the electronic apparatus 100 (i.e., paper-based sheets are set in the electronic apparatus 100), the wording 2 and the wording 3 are not displayed, and only the wording 1 is displayed. Similarly, in a case where the display condition 2 matches the set value for the electronic apparatus 100 (i.e., film-based sheets are set in the electronic apparatus 100), only the wording 2 is displayed. In this way, part of the manual appropriate for the current set value and deemed important to the user can be displayed.

Next, the wording 4 is an instruction related to a cutting mode. A description as to a cutting mode explains a solution for a problem of a sheet being struck by the printhead of the electronic apparatus 100 during printing, and is a setting for preventing erroneous detection in a case with sheets with curly edges. Cutting modes include user cutting, auto-cutting, and ejection cutting. In auto-cutting, a roll of paper is cut automatically with a cutter blade according to a setting configured by the printer driver. In ejection cutting, a sheet is cut with a cutter moved as operated on the touch screen. In user cutting, a user cuts a roll of paper with scissors. In a case where the display condition 4 matches the set value for the electronic apparatus 100 (i.e., the cutting mode is not user cutting, or sheet edge detection is not executed), the wording 4 is displayed on the display screen among the plurality of instructions related to cutting mode.

The wording 5 is an instruction related to setting of sheet feed width. There are three settings: quality prioritized, length prioritized, and auto. In quality prioritized, the sheet feed width is adjusted to make horizontal lines on a print product less noticeable. In length prioritized, the sheet feed width is adjusted so that the lengths of ruled lines on a print product may align. In a case where the display condition 5 matches a set value for the electronic apparatus 100 (i.e., the priority setting is length prioritized), the wording 5 is displayed on the display screen among a plurality of instructions related to feed width.

In this way, a display condition is set for every single wording. In S203 where the display condition match determination unit 104 compares the setting information/set value storage part 106 with the display conditions table 107, the display condition match determination unit 104 determines whether information in the setting information/set value storage part 106 satisfies a display condition.

Although FIG. 3 shows the wordings themselves, it is to be noted that the wordings in the manual stored in the manual storage part 108 may be divided into blocks, identification information may be assigned to each block, and the identification information may be associated with a display condition.

As thus described, information desired by a user can be displayed according to the present embodiment. Specifically, in response to a user operation, manual display range change processing is performed on a manual display screen, based on the current settings of the electronic apparatus. As a result, a manual display screen suitable for the current settings is displayed without displaying wordings related to settings other than the set values set for the electronic apparatus. Thus, improvement in straightforwardness can be expected.

Embodiment 2

In the present embodiment, a wording is displayed considering not only the wording display conditions described in the above embodiment, but also the physical situation in which the electronic apparatus is in. For example, ambient temperature affects the tendency of ink clogging or the way in which ink is ejected from the printing apparatus. Adding a function to sense ambient temperature makes it possible to display a message at the time of displaying a manual, indicating whether the ambient temperature is higher or lower than a predetermined ambient temperature. This could resolve the following problems: ink being ejected too much because the electronic apparatus 100 is placed at a location with high ambient temperature or ink clogging because the electronic apparatus 100 is placed at a location with low ambient temperature.

Figure 4:
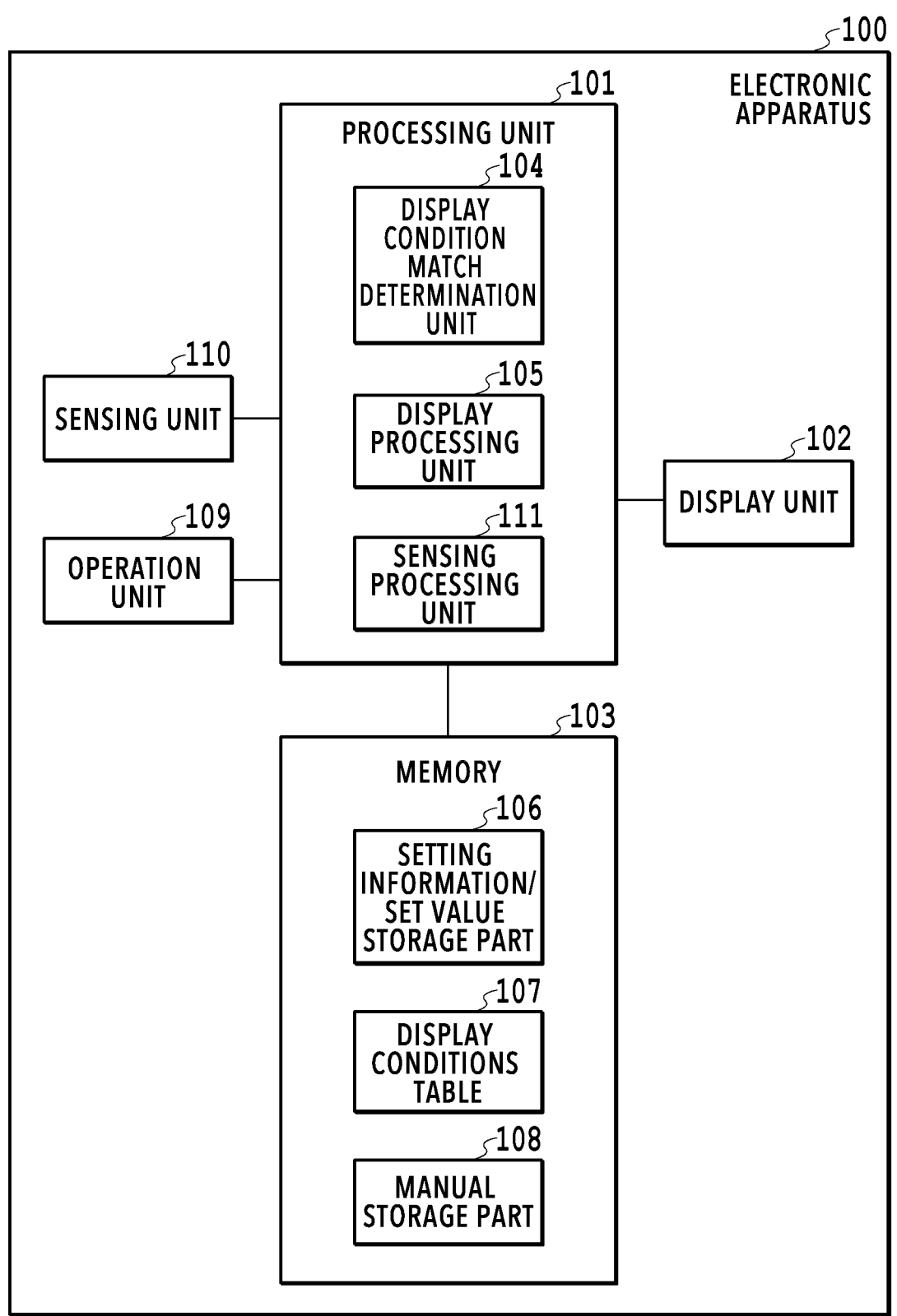
FIG. 4 is a block diagram of an electronic apparatus.

FIG. 4 is a block diagram of an electronic apparatus according to the present embodiment. The electronic apparatus shown in FIG. 4 has a sensing unit 110 and a sensing processing unit 111 in addition to the units in Embodiment 1. The sensing processing unit 111 processes information read by the sensing unit 110.

For example, the sensing unit 110 measures ambient temperature, and the determination in S203 in FIG. 2 is made additionally considering the ambient temperature as an element of the manual display determination. Then, in a case where a user opens a manual because, for example, a problem related to ink ejection has occurred in the electronic apparatus 100, the above configuration may help resolve the problem because a user can be informed in a case where the temperature of the room in which the electronic apparatus 100 is in is deviated from an appropriate value. Further, the manual display range may be changed based on the humidity measured by the sensing unit 110 because humidity too can affect how ink is ejected.

Embodiment 3

The present embodiment describes how the manual display screen is switched to a setting change screen (a screen for changing setting information and a set value for the electronic apparatus 100) using a setting change button disposed on a manual display screen, in addition to changing the manual display range.

Figure 5:
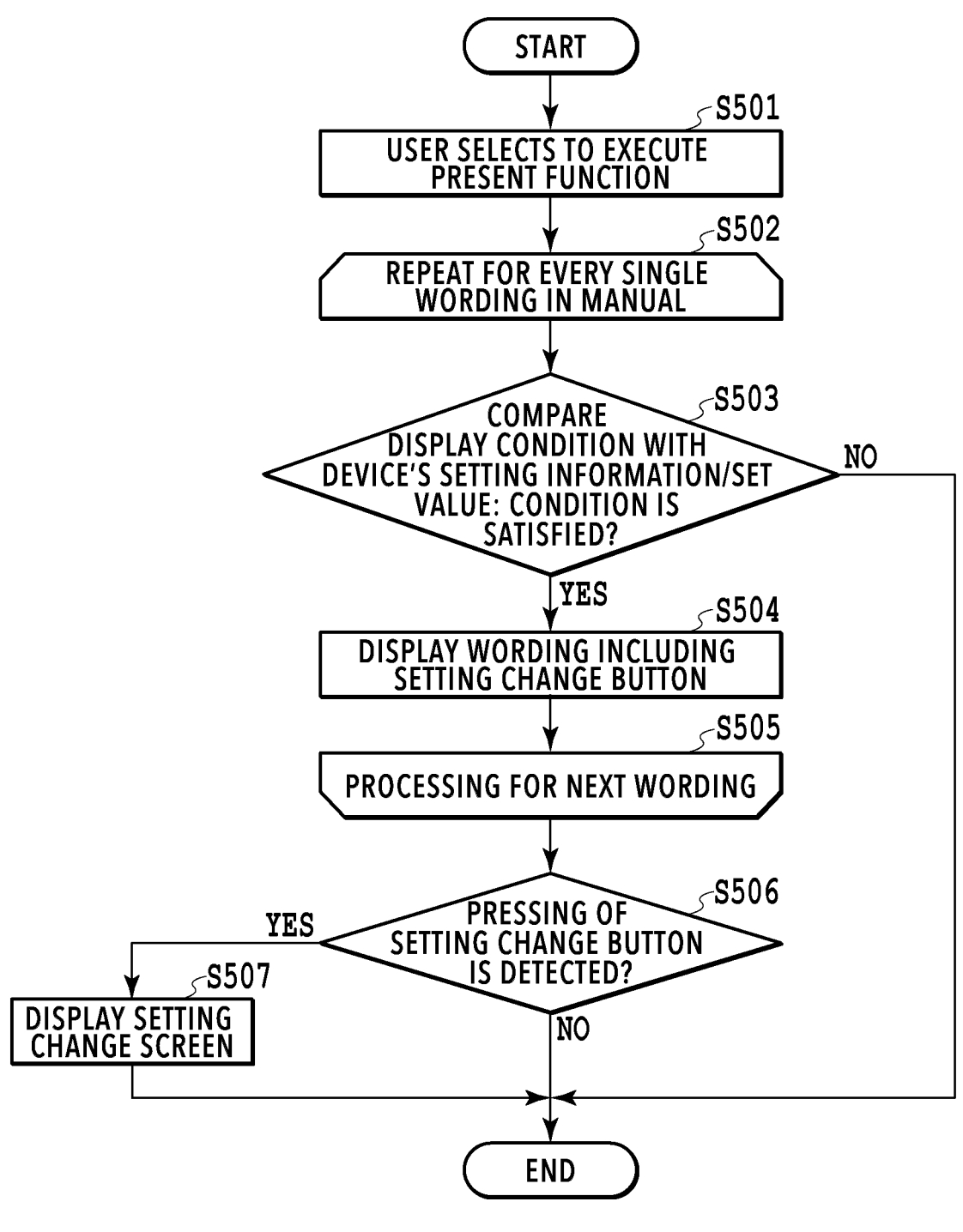
FIG. 5 is a flowchart of manual display.

FIG. 5 is a flowchart of the present embodiment. The processing of the present flowchart is started once the electronic apparatus 100 displays a manual on the display unit 102 in response to a user instruction to display the manual. Note that S501 to S503 in FIG. 5 are the same processing as S201 to S203 in FIG. 2 and are therefore not described here.

In S504, the electronic apparatus 100 displays a screen including not only the wording in the manual according to the display range changed by the processing in S502 and S503, but also a setting change button. S502 to S505 are loop processing executed for every wording.

In S506, the electronic apparatus 100 determines whether the setting change button has been pressed. If the setting change button has been pressed, the processing proceeds to S507. Meanwhile, if pressing of the setting change button is not detected, the present processing ends.

In S507, the electronic apparatus 100 displays a setting change screen corresponding to the wording displayed on the manual display screen. Then, the setting is changed as needed by a user operation. After that, the present processing ends.

FIG. 6 is an example of how the manual is displayed. A manual display screen 601 is a display screen displayed by the electronic apparatus 100 in S504. In addition to the manual according to the display range changed, a setting change button 602 is disposed. Once the setting change button 602 is pressed by a user operation, a setting change screen 603 is displayed. Because such a setting change screen 603 is prepared, the user can be saved from having to switch to a setting change screen with a regular method, which improves user operability.

Embodiment 4

The present embodiment describes a method in which a screen displayed is switched between a regular manual display screen and the display screen according to the changed manual display range described in Embodiment 1 every time a user operates a button.

Figure 7:
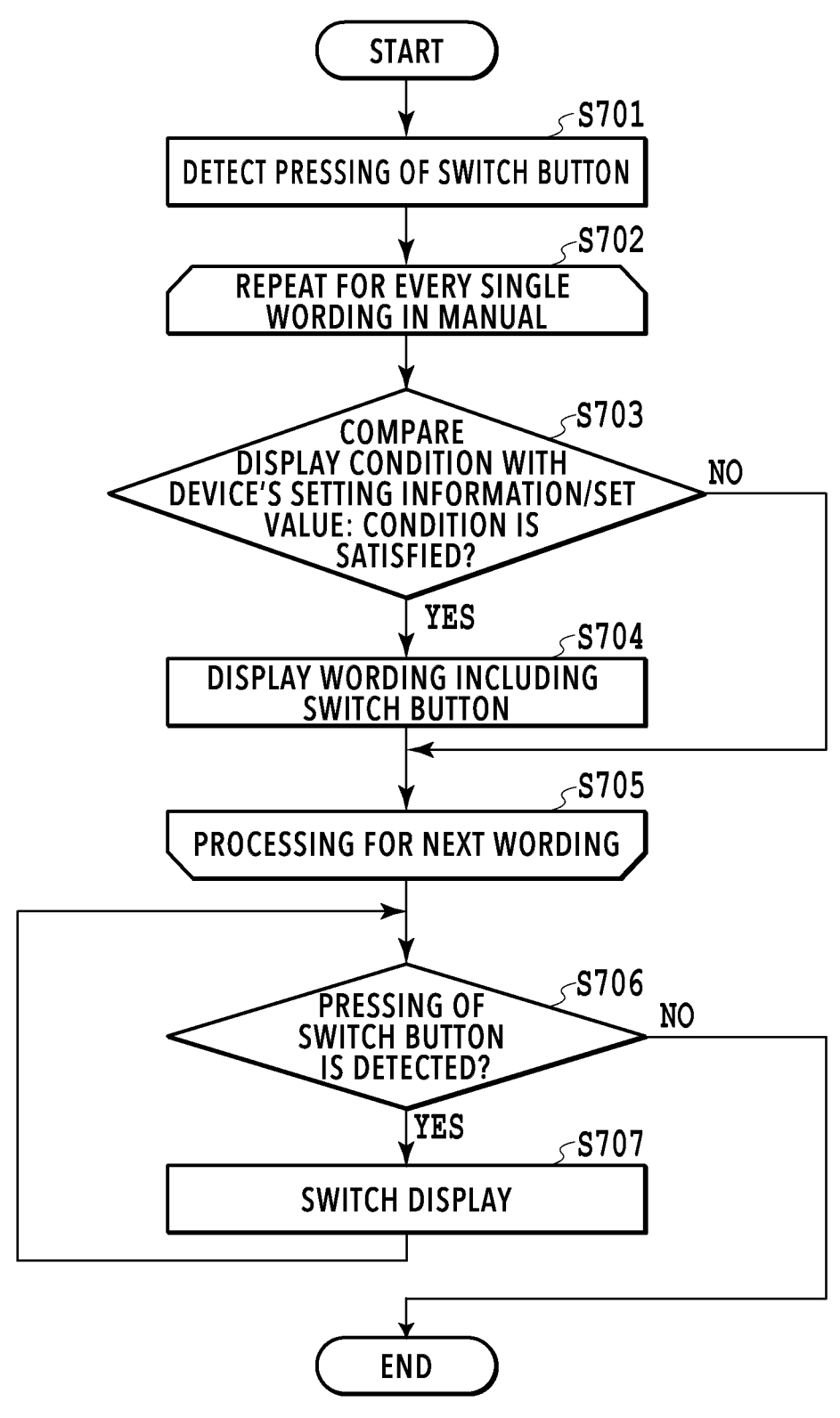
FIG. 7 is a flowchart of manual display.

FIG. 7 is a flowchart of the present embodiment. The processing of the present flowchart is started once the electronic apparatus 100 displays a manual on the display unit 102 in response to a user instruction to display the manual.

In S701, the electronic apparatus 100 detects pressing of a switch button as an operation to perform the display range change processing. S702 and S703 are the same as S202 and S203 in FIG. 2 and are therefore not described here. In S704, the electronic apparatus 100 displays a screen having a switch button in addition to the manual according to the changed display range. S702 to S705 are loop processing executed for every wording.

In S706, the electronic apparatus 100 determines whether the switch button has been pressed by a user operation. If pressing of the switch button is detected, processing proceeds to S707. Meanwhile, if pressing of the switch button is not detected, the present processing ends.

In S707, a screen displayed is switched between the regular manual display screen and the manual display screen obtained by the display range change processing. Specifically, in the switching processing in S707, in a case where the manual currently displayed is the regular manual, the screen displayed is switched to the manual obtained by the display range change processing. Meanwhile, in a case where the manual currently displayed is the manual obtained by the display range change processing, the screen displayed is switched to the regular manual. After that, the present processing ends.

FIG. 8 is a diagram showing an example of how the manual is displayed in the present embodiment. A manual display screen 801 is a screen displaying the regular manual in which the manual display range is not changed. In a case where a display switch button 802 is pressed on the manual display screen 801, the screen can be switched to a manual display screen 803 showing the manual obtained by the manual display range change processing. Also, in a case where the switch button 802 is pressed again on the manual display screen 803, the screen switches to the regular manual display screen 801. The display screen is switched every time the user presses the switch button 802.

Embodiment 5

The present embodiment describes a method in which a passage from the manual determined to be displayed by the display condition match determination unit 104 is transmitted to an external apparatus such as a smartphone and a tablet.

Figure 9:
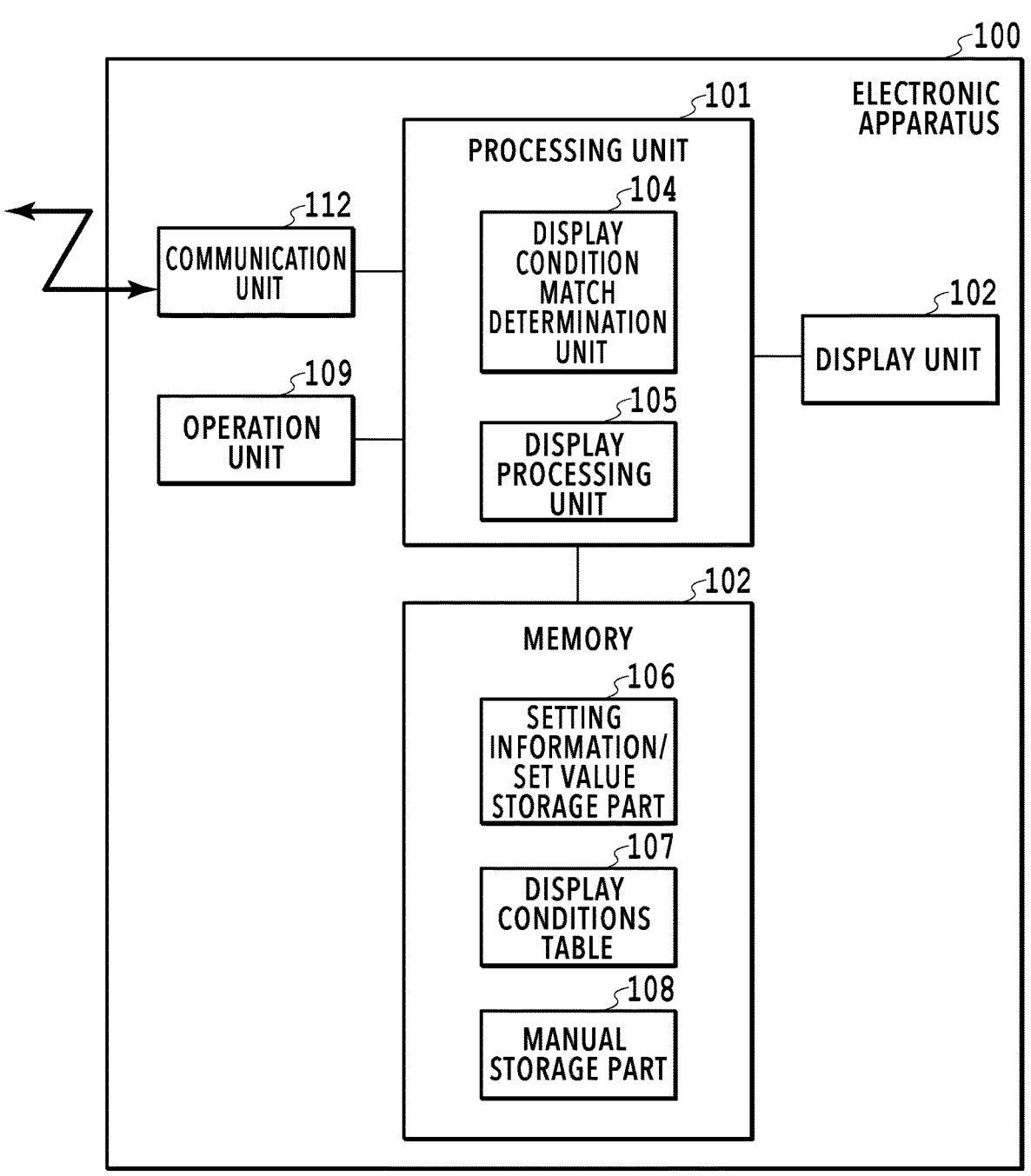
FIG. 9 is a block diagram of an electronic apparatus.

FIG. 9 is a block diagram of an electronic apparatus of the present embodiment. The electronic apparatus shown in FIG. 9 has a communication unit 112 in addition to the configuration of the electronic apparatus 100 shown in Embodiment 1.

The communication unit 112 transmits a passage of the manual determined to be displayed by the display condition match determination unit 104 to an external apparatus such as a smartphone or a tablet. The external apparatus displays the manual of the electronic apparatus 100 on its display unit via a web browser.

Figure 10:
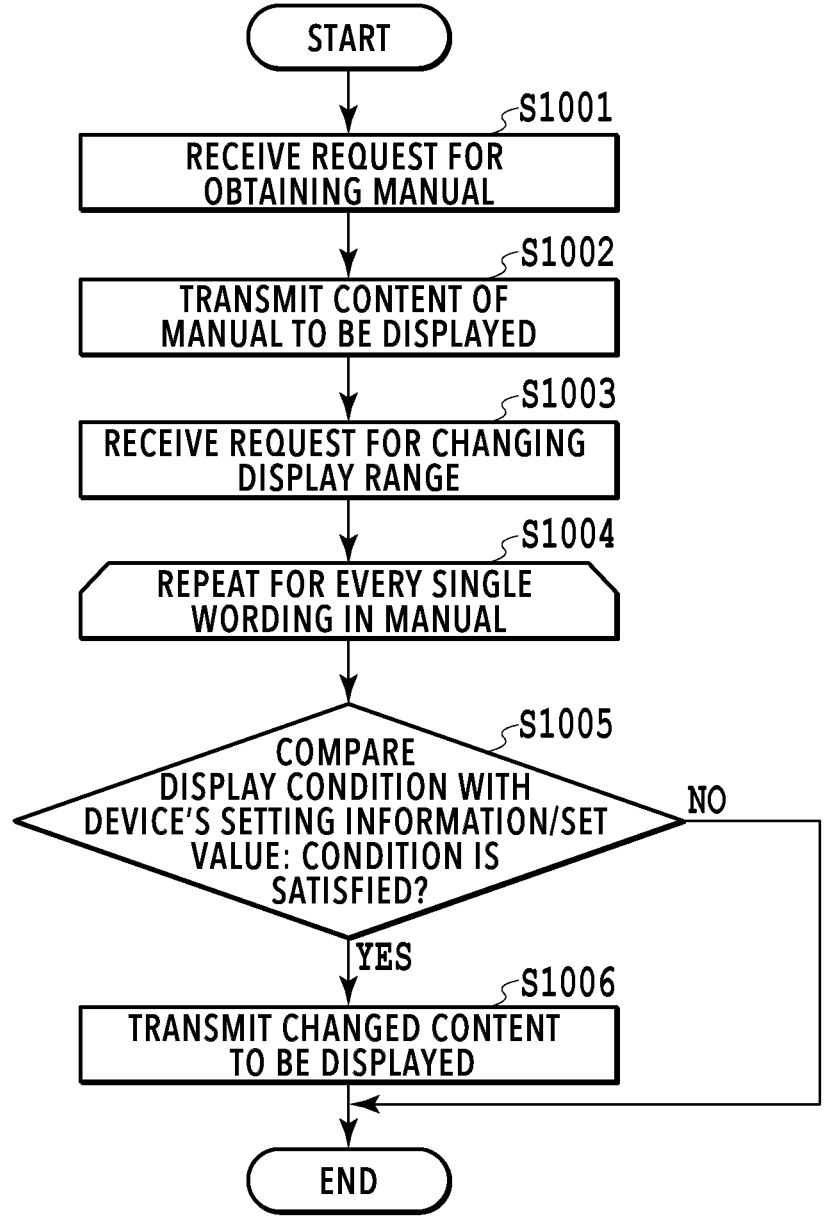
FIG. 10 is a flowchart of manual display.

FIG. 10 is a diagram showing the procedure of processing performed by the electronic apparatus of the present embodiment to transmit a manual to an external apparatus. The processing of the present flowchart is started once the external apparatus is ready for a user to perform an operation for displaying a manual on the external apparatus.

In S1001, the electronic apparatus 100 receives a manual obtaining request from the external apparatus. The user transmits this request using the external apparatus to the electronic apparatus 100 through the communication unit 112 of the electronic apparatus 100 so that the manual may be displayed on the external apparatus.

In S1002, the electronic apparatus 100 transmits content of the manual to the external apparatus using the communication unit 112.

In S1003, the electronic apparatus 100 receives a request to change the display range of the manual through the communication unit 112. Specifically, the request is transmitted from the external apparatus to the electronic apparatus 100 once the user performs an operation, using the external apparatus, for changing the display range of the manual transmitted to the external apparatus in S1001.

S1004 and S1005 are the same as S202 and S203 in FIG. 2 and are therefore not described here.

In S1006, the display processing unit 105 of the electronic apparatus 100 transmits the wording in the manual determined as satisfying the display condition in S1004 to the external apparatus using the communication unit 112. After the processing in S1004 to S1006 is performed for every wording in the manual, the present processing ends.

Figure 11:
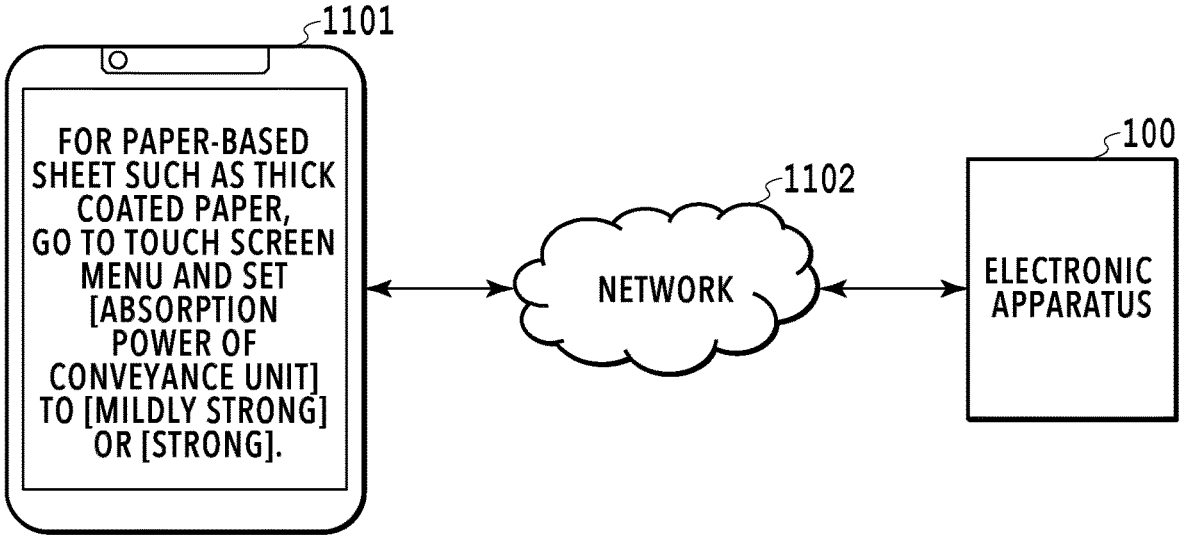
FIG. 11 is an example of how a manual is displayed.

FIG. 11 is a diagram showing the configuration of the present embodiment. In S1005, the display processing unit 105 transmits the wording in the manual determined as satisfying the display condition in S1004 to an external apparatus 1101 via a network 1102 using the communication unit 112. The external apparatus 1101 receives the wording transmitted thereto and displays it on the screen, so that the user can see, on the external apparatus 1101, the manual obtained by execution of the present function.

Note that the following mode is also possible in the flowchart in FIG. 10: the manual obtained by the display range change processing is transmitted to the external apparatus without S1001 and S1002 being executed.

Other Embodiments

The functions described in the above embodiments may be used in combination. For example, the setting change button disposed in Embodiment 3 and the switch button disposed in Embodiment 4 may be disposed on a single manual display screen, and their respective functions may be executed upon pressing of the buttons.

Although the manual is saved in the manual storage part 108 of the electronic apparatus in the above embodiments, the present disclosure is not limited to this. For example, the manual may be saved in an external server, and the electronic apparatus 100 may obtain information on the manual from the external server in displaying the manual.

The present disclosure can also be implemented by the following processing: programs implementing one or more functions in the above embodiments are supplied to a system or apparatus via a network or a storage medium, and one or more processors in a computer in the system or apparatus read and execute the programs. The present disclosure can also be implemented by a circuit (e.g., an ASIC) implementing the one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-181235, filed Nov. 11, 2022, which is hereby incorporated by reference wherein in its entirety.

What is claimed is:

1. An electronic apparatus capable of executing predetermined processing relative to an electronic manual thereof, the electronic apparatus comprising:

one or more processors; and one or more memories storing instructions that, when executed by the one or more processors, cause the electronic apparatus to:

receive a first user operation to display the electronic manual of the electronic apparatus, wherein the electronic manual is stored in the one or more memories;

cause the electronic apparatus to display, based on the received first user operation, a first screen including a first part of the electronic manual and a second part of the electronic manual different from the first part of the electronic manual, wherein the first part and the second part are regarding a first setting item;

acquire a setting value of a second setting item different from the first setting item, wherein the setting value of the second setting item is stored in the one or more memories of the electronic apparatus;

cause the electronic apparatus to display, in a case where the acquired setting value of the second setting item is a first setting value and a second user operation is received via the displayed first screen, a second screen including the first part of the electronic manual and not including the second part of the electronic manual, wherein the first part is stored in the one or more memories corresponding to the first setting value of the second setting item and the second part is stored in the one or more memories corresponding to a second setting value of the second setting item, and causing the electronic apparatus to display, in a case where the setting value of the second setting item is the second setting value different from the first setting value and the second user operation is received via the displayed first screen, a third screen including the second part of the electronic manual and not including the first part of the electronic manual, wherein the first part and the second part are included in the electronic manual and the first part of the electronic manual is more pertinent to the first setting value than the second part of the electronic manual.

2. The electronic apparatus according to claim 1, wherein the second screen includes an object for changing a setting value of the first setting item, and in response to receiving an operation for selecting the object from a user, the one or more processors cause the electronic apparatus to display a display screen for changing the setting value of the first setting item.

3. The electronic apparatus according to claim 1, wherein the electronic manual is displayed on a display unit of the electronic apparatus.

4. The electronic apparatus according to claim 1, further comprising a printing unit that executes printing processing.

5. The electronic apparatus according to claim 4, wherein the first setting value and the second setting value are setting values for setting a type of a consumable item in execution of the printing processing.

6. The electronic apparatus according to claim 5, wherein the consumable item is a sheet.

7. The electronic apparatus according to claim 1, wherein the electronic manual includes at least one of a description related to a setting of absorption power, a description related to a cutting mode, and a description related to a priority setting.

8. The electronic apparatus according to claim 1, wherein the second setting item is different from the first setting item.

9. A non-transitory computer readable storage medium storing a program which functions in an electronic apparatus capable of executing predetermined processing relative to an electronic manual thereof, the electronic apparatus comprising one or more processors and one or more memories that cooperate, when the program is executed, to cause the electronic apparatus to:

receive an instruction to display the electronic manual of the electronic apparatus, wherein the electronic manual is stored in the one or more memories; and display, based on a received first user operation, a first screen including a first part of the electronic manual and a second part of the electronic manual different from the first part of the electronic manual, wherein the first part and the second part are regarding a first setting item;

acquire a setting value of a second setting item different from the first setting item, wherein the setting value of the second setting item is stored in the one or more memories of the electronic apparatus;

display, in a case where the acquired setting value of the second setting item is a first setting value, and a second user operation is received via the displayed first screen, a second screen including the first part of the electronic manual and not including the second part of the electronic manual, wherein the first part is stored in the one or more memories corresponding to the first setting value of the second setting item and the second part is stored in the one or more memories corresponding to a second setting value of the second setting item, and display, in a case where the setting value of the second setting item is the second setting value different from the first setting value, and the second user operation is received via the displayed first screen, a third screen including the second part of the electronic manual and not including the first part of the electronic manual, wherein the first part and the second part are included in the electronic manual and the first part of the electronic manual is more pertinent to the first setting value than the second part of the electronic manual.

* * * * *